(12) United States Patent
Tsai

(10) Patent No.: US 11,096,440 B2
(45) Date of Patent: Aug. 24, 2021

(54) MULTIFUNCTIONAL LENS ASSEMBLY

(71) Applicant: Cheng-Liang Tsai, Tainan (TW)

(72) Inventor: Cheng-Liang Tsai, Tainan (TW)

(*) Notice: Subject to any disclaimer, the term of this patent is extended or adjusted under 35 U.S.C. 154(b) by 418 days.

(21) Appl. No.: 16/007,707

(22) Filed: Jun. 13, 2018

(65) Prior Publication Data

US 2019/0133238 A1    May 9, 2019

(30) Foreign Application Priority Data

Nov. 6, 2017  (TW) .................... 106216458

(51) Int. Cl.

| | |
|---|---|
| *G02B 5/20* | (2006.01) |
| *G02B 27/00* | (2006.01) |
| *A42B 3/24* | (2006.01) |
| *A42B 3/22* | (2006.01) |
| *G02B 1/10* | (2015.01) |
| *B32B 33/00* | (2006.01) |
| *G02C 7/16* | (2006.01) |
| *G02B 1/14* | (2015.01) |
| *G02B 1/11* | (2015.01) |

(52) U.S. Cl.
CPC ............ *A42B 3/245* (2013.01); *A42B 3/226* (2013.01); *A42B 3/24* (2013.01); *B32B 33/00* (2013.01); *G02B 1/10* (2013.01); *G02B 1/11* (2013.01); *G02B 1/14* (2015.01); *G02B 5/208* (2013.01); *G02B 27/0006* (2013.01); *G02C 7/16* (2013.01)

(58) Field of Classification Search
CPC .. B32B 33/00; G02B 1/14; G02B 1/10; G02B 1/11; A42B 3/245; A42B 3/24
USPC ......................................... 359/361
See application file for complete search history.

(56) References Cited

U.S. PATENT DOCUMENTS

2011/0283431 A1\* 11/2011 Miller, IV ............ G02C 7/101
2/10

\* cited by examiner

*Primary Examiner* — Jerry L Brooks
(74) *Attorney, Agent, or Firm* — Muncy, Geissler, Olds & Lowe, P.C.

(57) ABSTRACT

A multifunctional lens assembly includes a functional transparent plate and a layered adhesive body. The functional transparent plate includes spaced apart through holes disposed in an outer peripheral region thereof. Each through hole extends through two opposite surfaces of the outer peripheral region. The layered adhesive body is attached to the functional transparent plate for adhering the functional transparent plate to a face shield of a mobile helmet. The layered adhesive body has a first layer 61 disposed on one of the two opposite surfaces of the outer peripheral region facing toward the face shield, and connection studs respectively extending through the through holes and integrally connecting the first layer.

12 Claims, 6 Drawing Sheets

MULTIFUNCTIONAL LENS ASSEMBLY

CROSS-REFERENCE TO RELATED APPLICATION

This application claims priority of Taiwanese Patent Application No. 106216458, filed on Nov. 6, 2017.

FIELD

The disclosure relates to a les assembly, and more particularly to a multifunctional lens assembly mountable on a face shield of a helmet.

BACKGROUND

As shown in FIGS. 1 and 2, an anti-fogging lens 1 is mounted to a mobile helmet 2 by using two fasteners 21, such as screws. The mobile helmet 2 includes a face shield 22 that is disposed in front of the mobile helmet 2 and that allows the fasteners 21 to be mounted thereon. The anti-fogging lens 1 has two engagement grooves 11 respectively disposed on left and right sides thereof. In assembly, the anti-fogging lens 1 is disposed in abutment with the face shield 22 and the engagement grooves 11 is engaged with the fasteners 21.

Although the anti-fogging lens 1 can increase a defogging effect of the mobile helmet 2, in order to assemble the anti-fogging lens 1 to the face shield 22, the fasteners 21 have to be mounted to the face shield 22. Apart from a need of a tool for assembling the anti-fogging lens 1 to the face shield 22, the face shield 22 has to be drilled with holes therein, thereby impairing structural strength and integrity and affecting wind-shielding effect of the face shield 22.

SUMMARY

Therefore, an object of the disclosure is to provide a multifunctional lens assembly that can alleviate at least one of the drawbacks of the prior art.

According to the disclosure, a multifunctional lens assembly for connecting a face shield of a mobile helmet includes a functional transparent plate and a layered adhesive body.

The functional transparent plate has at least a defogging function. The functional transparent plate includes a plurality of spaced apart through holes disposed in an outer peripheral region of the functional transparent plate. Each of the through holes extends through two opposite surfaces of the outer peripheral region.

The layered adhesive body is attached to the functional transparent plate for adhering the functional transparent plate to the face shield. The layered adhesive body has a first layer disposed on one of the two opposite surfaces of the outer peripheral region facing toward the face shield, and a plurality of the connection studs respectively extending through the through holes and integrally connecting the first layer.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
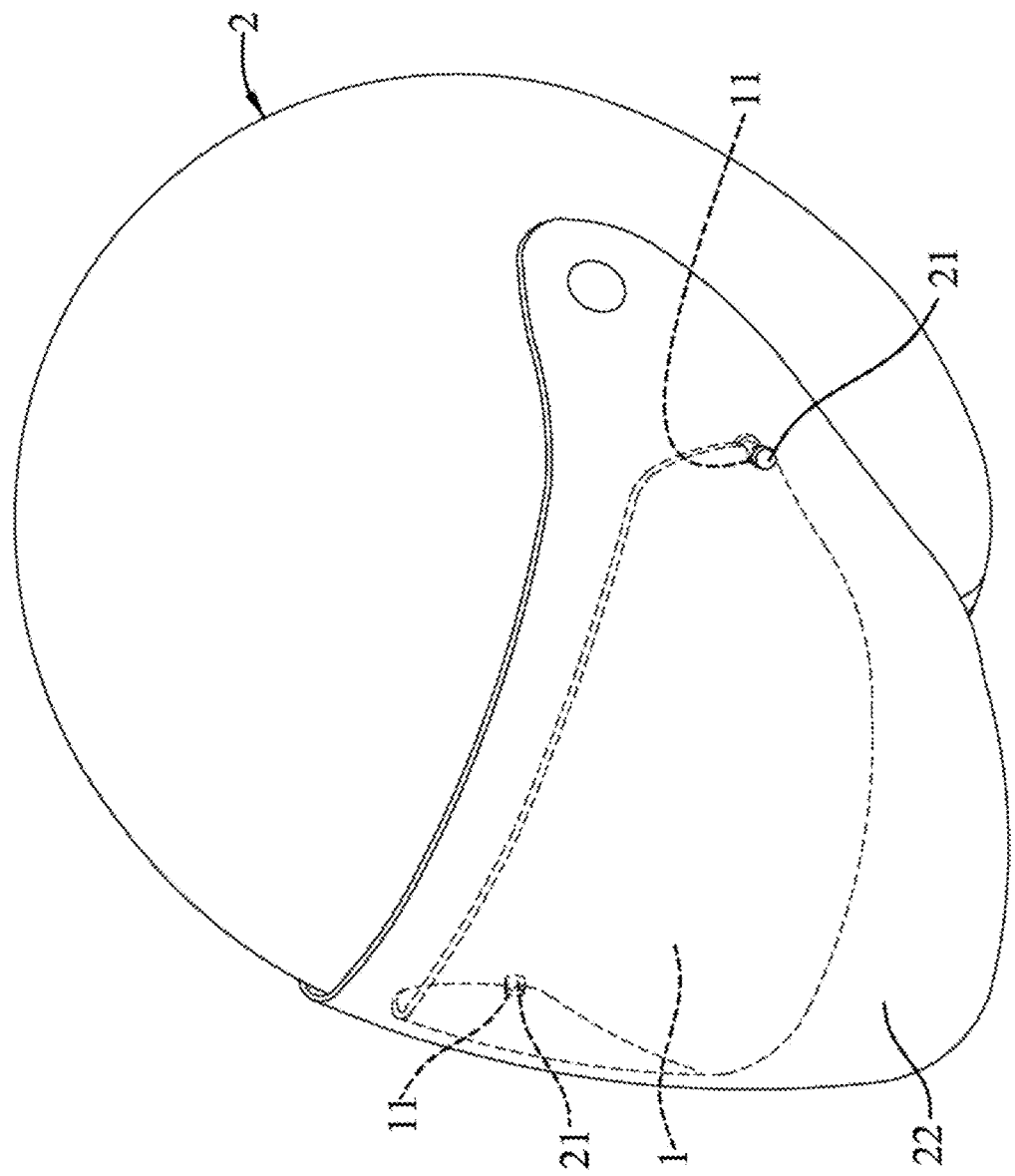
FIG. 1 is a perspective view of a prior art illustrating an anti-defogging lens mounted to a face shield of a mobile helmet.
Figure 2:
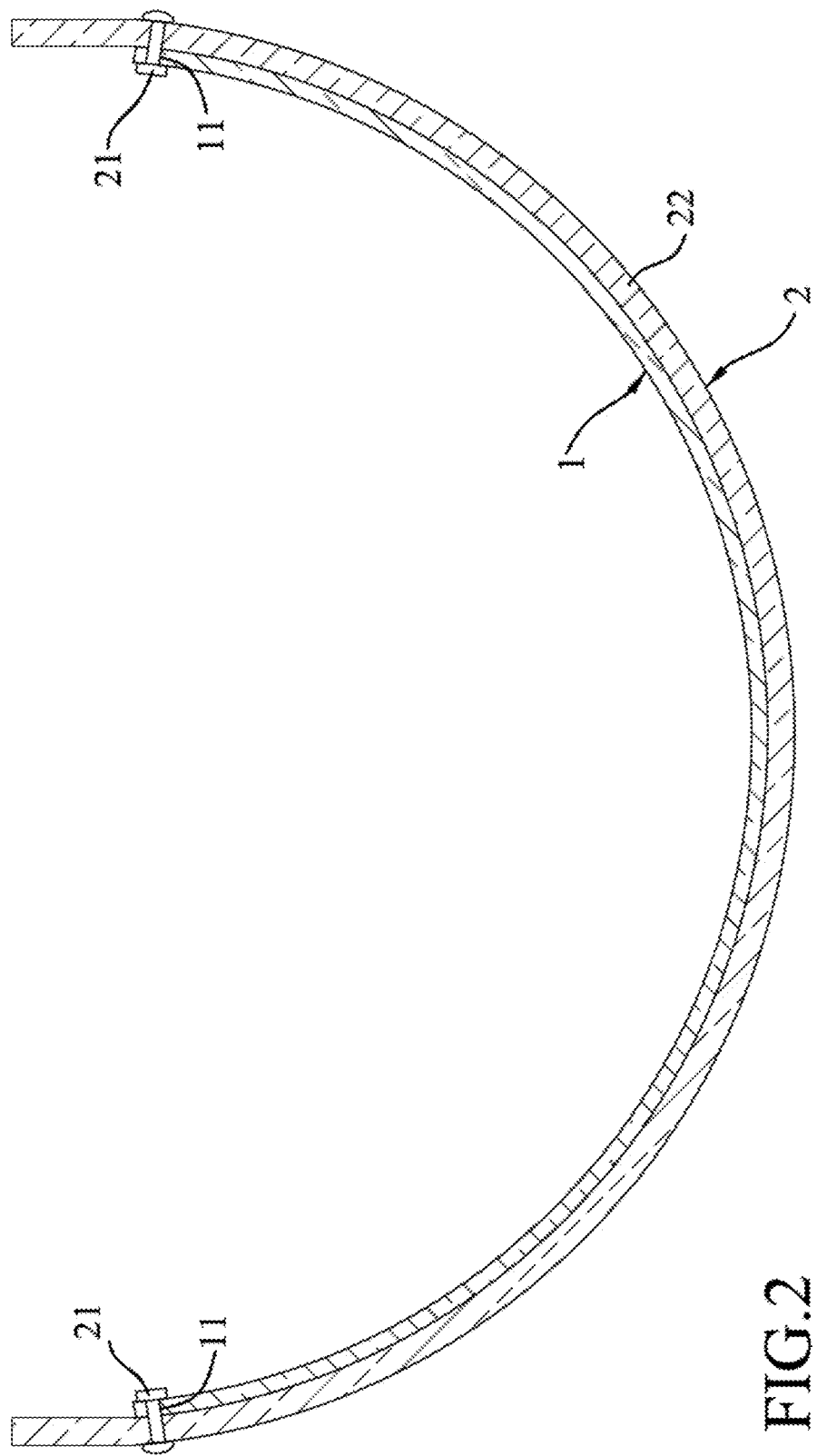
FIG. 2 is a top sectional view of the prior art.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 3:
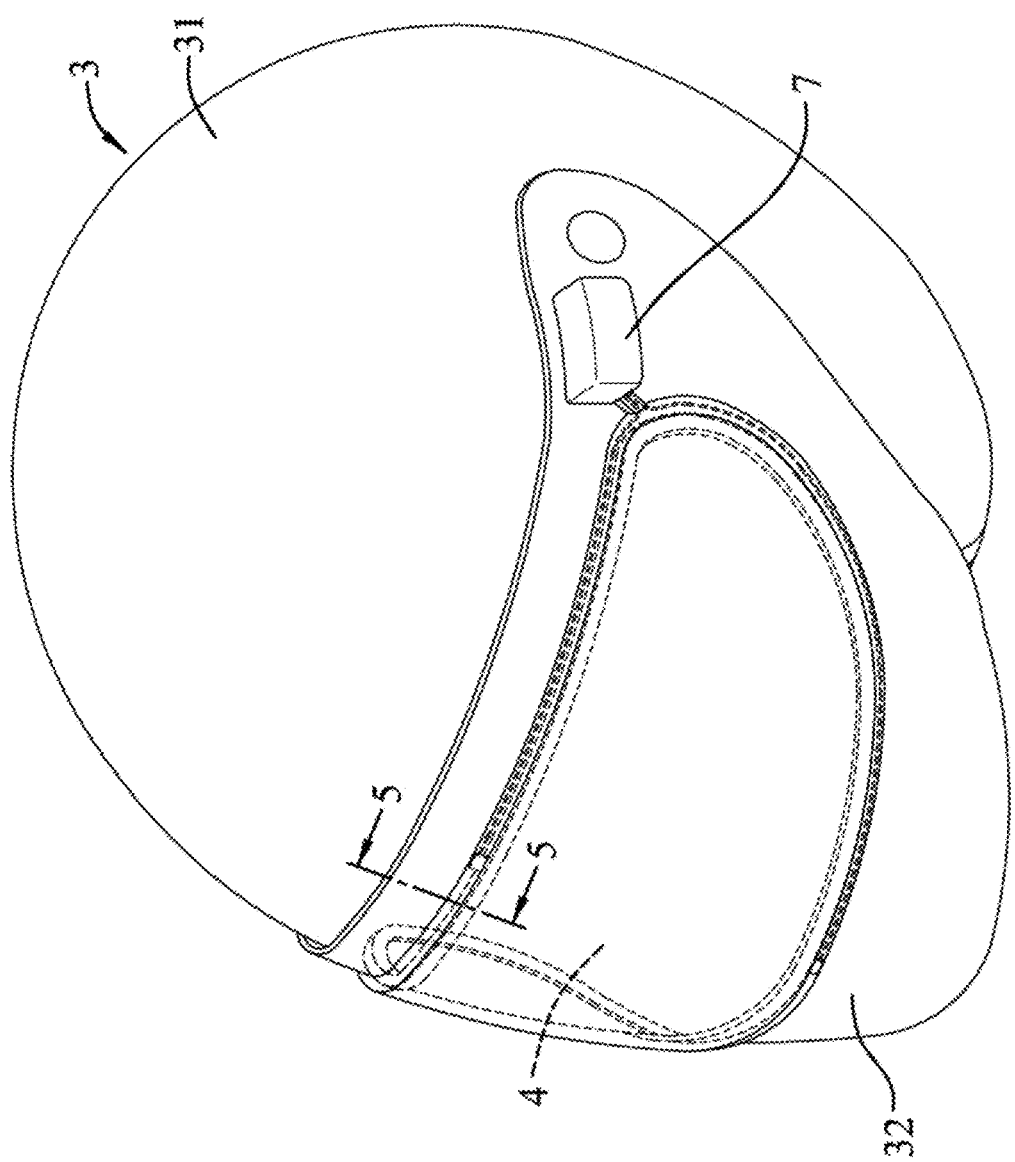
FIG. 3 is a perspective view illustrating a multifunctional lens assembly according to an embodiment of the disclosure connected to a face shield of a mobile helmet.
Figure 4:
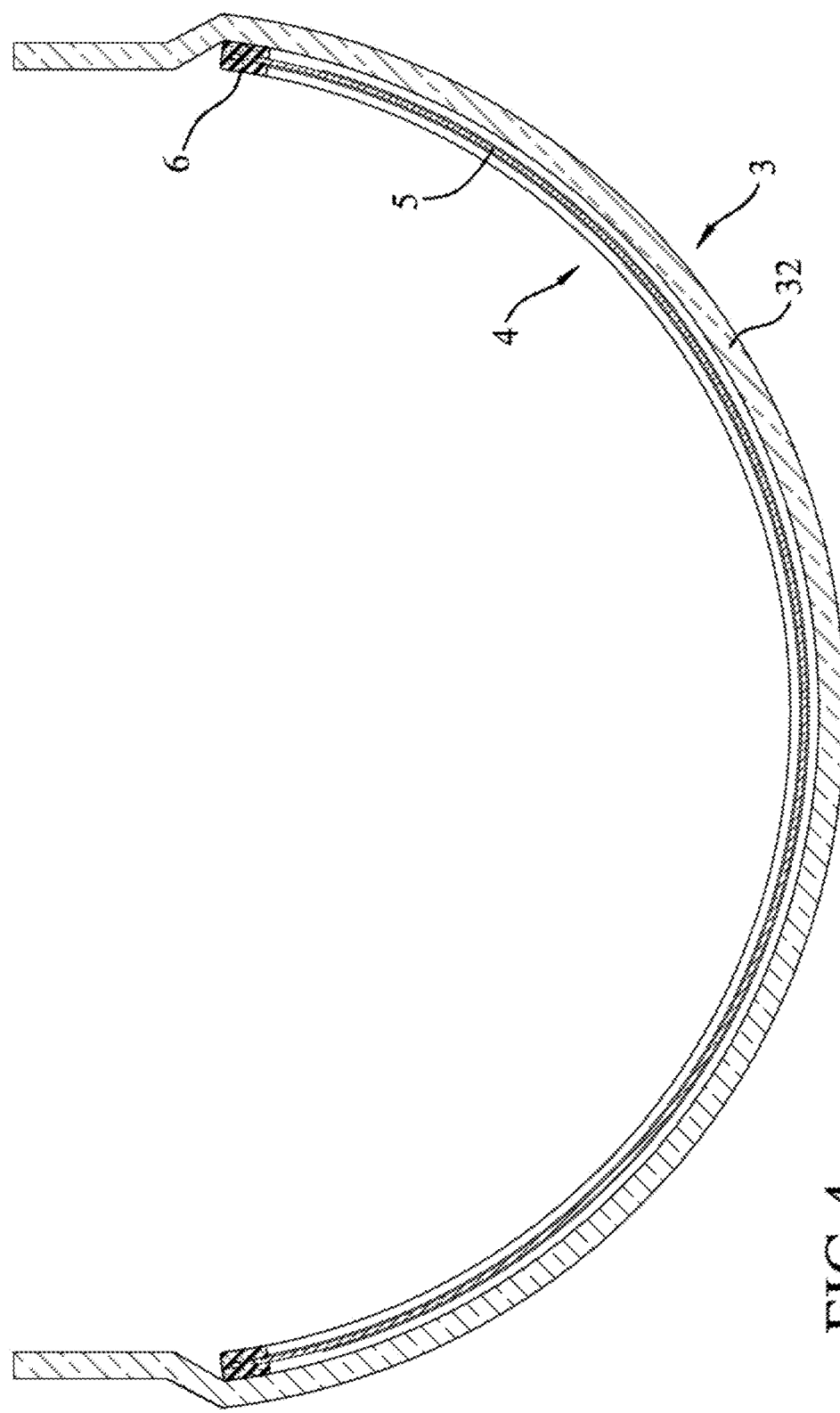
FIG. 4 is a top sectional view illustrating the multifunctional lens assembly and the face shield.
Figure 5:
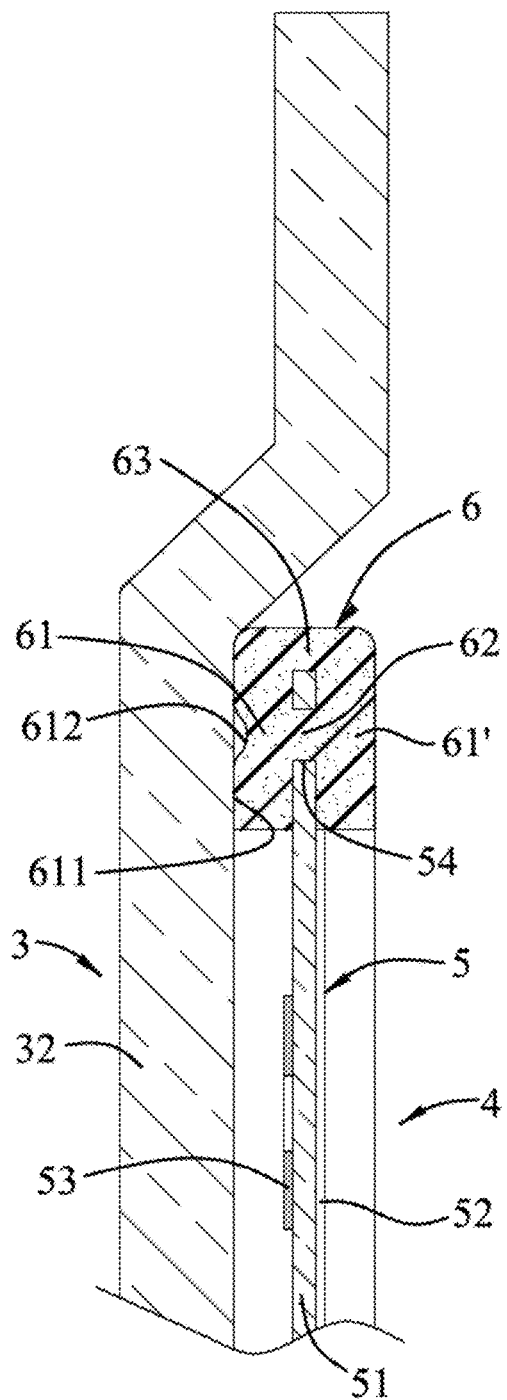
FIG. 5 is a fragmentary sectional view illustrating the multifunctional lens assembly and the face shield.
Figure 6:
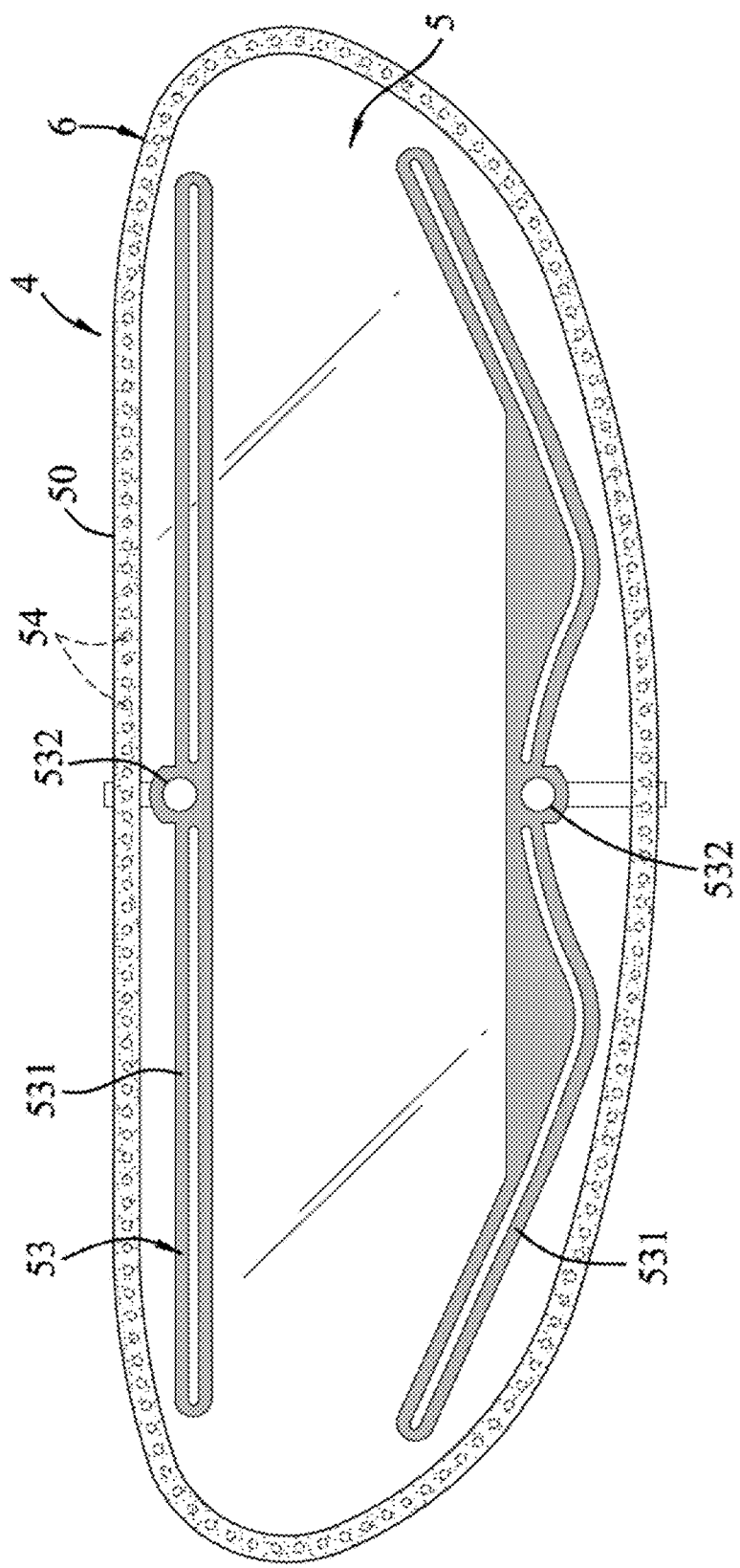
FIG. 6 is a front view of the multifunctional lens assembly.

Referring to FIGS. 3 to 6, a multifunctional lens assembly 4 according to an embodiment of the disclosure suitable for being removably mounted on a mobile helmet 3 is illustrated. The mobile helmet 3 has a helmet body 31, and a face shield 32 connected to the helmet body 31 in an openable or closable manner. The face shield is a transparent curved plate to protect a user's face and provide visibility for the user. The multifunctional lens assembly 4 is removably mounted on the face shield 32, and includes a functional transparent 5 and a layered adhesive body 6.

The functional transparent plate 5 includes a plurality of spaced apart through holes 54 disposed in an outer peripheral region 50 of the functional transparent plate 5. Each of the through holes 54 extends through two opposite surfaces of the outer peripheral region 50. The functional transparent plate 5 further includes a lens plate 51 that has the outer peripheral region 50, a functional layer 52 coated on the lens plate 51, and a conductive layer 53. In this embodiment, the lens plate 51 is disposed at a rear side of the face shield 32 in a spaced apart manner. The conductive layer 53 is disposed on one side of the lens plate 51 facing toward the face shield 32. The functional layer 52 is disposed on another side of the lens plate 51 opposite to the conductive layer 53. However, the disposition of the lens plate 51, the functional layer 52 and the conductive layer 53 is not limited to this embodiment. For example, the lens plate 51 may be mounted on a front side the face shield 32. Apart from that, the functional layer 52 may be disposed in front of the transparent layer 51, or else the conductive layer 53 may be disposed at the rear of the lens plate 51.

The lens plate 51 is made from a pliable material such as plastic or the like. The lens plate 51 may be a regular lens, a photochromic lens that can change into dark colors to block ultraviolet or sun rays, or a corrective lens that can correct myopia, hyperopia, presbyopia and/or astigmatism. The lens plate 51 is bent in compliance with a curvature of the face shield 32, and can be varied in size, shape or color based on design requirements.

The functional layer 52 has at least one of anti-ultraviolet, anti-glare, anti-reflection and anti-scratch functions. In this embodiment, the functional layer 52 is exemplified as an anti-ultraviolet coating having the anti-ultraviolet function. On the other hand, the functional layer 52 is not limited only to a single-layer coating, and may be a multi-layered coating. In addition, the functional layer 52 can be disposed on either one side or both sides of the lens plate 51. In some embodiments, the functional transparent plate 5 has a different anti-ultraviolet functional configuration, for example, which dispenses with the functional layer 52 formed from the anti-ultraviolet coating. In that configuration, anti-ultraviolet particles are uniformly dispersed in the material of the lens plate 51 during fabrication of the lens plate 51.

The conductive layer 53 can be electrified to heat the lens plate 51 for defogging. In this embodiment, the conductive layer 53 has two heating elements 531 that are spaced apart and disposed one above the other, and two pair of electrode portions 532 (only one is visible in FIG. 6). Each pair of the electrode portions 532 is electrically connected to one of said heating elements 531. The heating elements 531 are lengthened in a left-right direction and are located at positions out of the field of vision of the user's eyes so as to avoid obstruction to the vision of the user. Each heating element 531 can be a metal wire or a silver adhesive and can be formed on the lens plate 51 by embedding, coating or printing. Notably, while two heating elements 531 are used in this embodiment, the number of the heating elements 531 may be varied.

The layered adhesive body 6 is attached to the functional transparent plate 5, and forms a loop that extends along a full length of the outer peripheral region 50 of the functional transparent plate 5. The layered adhesive body 6 is a pressure sensitive adhesive, by which the functional transparent plate 5 can be repeatedly attached to or detached from the face shield 32. The layered adhesive body 6 has a first layer 61, a plurality of connection studs 62, a second layer 61', and a lateral connection portion 63. The first layer 61 is disposed on one of the two opposite surfaces of the outer peripheral region 50 of the functional transparent plate 5 facing toward the face shield 32. The connection studs 62 respectively extend through the through holes 54 and integrally connect the first layer 61. The second layer 61' is formed at the other one of the two opposite surfaces of the outer peripheral region 50 and is connected integrally to the connection studs 62. The lateral connection portion 63 extends around the outer peripheral region 50 of the functional transparent plate 5 and connects integrally the first and second adhesive layers 61, 61'. The first adhesive layer 61 has an adhesive surface 611 that is spaced apart from the one of the two opposite surfaces of the outer peripheral region 50, on which the first adhesive layer 61 is disposed, and that adheres to the face shield 32. The adhesive surface 611 has a plurality of suction concavities 612 that are concaved respectively toward the connection studs 62. In this embodiment, the suction concavities 612 are respectively aligned with the connection stud 62 and provide a sucking effect, like suction cups, for enhancing adhesion strength. While the layered adhesive body 6 has the first and second layers 61, 61' in this embodiment, the embodiment may be implemented by using only the first layer 61 and by omitting of the lateral connection portion 63.

By pressing the adhesive surface 611 of the first layer 61 against the face shield 32, the multifunctional lens assembly 4 can be easily assembled to the face shield 32. In use, apart from the anti-ultraviolet function provided by the functional layer 52, the conductive layer 53 can be electrified through a circuit control device 7 (see FIG. 3) to heat the transparent plate layer 51 for defogging and ensuring that the user has a clear vision. When the functional transparent plate 5 wears, or replacement of the functional transparent plate 5 is required, the layered adhesive body 6 may be peeled off from the face shield 32 to detach and replace the multifunctional lens assembly 4 with a new one.

To sum up, by virtue of the layered adhesive body 6 which adheres to the face shield 32, the multifunctional lens assembly 4 can be easily assembled to the face shield 32 without using any tool and any fastener, such as, a screw and pivot pin. Therefore, the face shield 32 needs not be drilled with holes, which can impair structural strength and integrity, as well as the wind shielding function of the face shield 32. Further, due to the disposition of the conductive layer 53 and the functional layer 52, in addition to the defogging function, the multifunctional lens assembly 4 provides a clear line of sight and a feel of comfort to the user's eye.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A multifunctional lens assembly for connecting a face shield of a mobile helmet, comprising:
 a functional transparent plate having at least a defogging function, said functional transparent plate including a plurality of spaced apart through holes disposed in an outer peripheral region of said functional transparent plate, each of said through holes extending through two opposite surfaces of said outer peripheral region; and
 a layered adhesive body attached to said functional transparent plate for adhering said functional transparent plate to the face shield, said layered adhesive body having a first layer disposed on one of said two opposite surfaces of said outer peripheral region facing toward the face shield, and a plurality of connection studs respectively extending through said through holes and integrally connecting said first layer.

2. The multifunctional lens assembly as claimed in claim 1, wherein said first layer has an adhesive surface spaced apart from said one of said two opposite surfaces of said outer peripheral region and configured to adhere to the face shield, said adhesive surface having a plurality of suction concavities that are concaved respectively toward said connection studs.

3. The multifunctional lens assembly as claimed in claim 2, wherein said suction concavities are respectively aligned with said connection studs.

4. The multifunctional lens assembly as claimed in claim 1, wherein said layered adhesive body forms a loop that extends along a full length of said outer peripheral region.

5. The multifunctional lens assembly as claimed in claim 1, wherein said layered adhesive body further has a second layer that is formed at the other one of said two opposite surfaces of said outer peripheral region and that is connected integrally to said connection studs.

6. The multifunctional lens assembly as claimed in claim 5, wherein said layered adhesive body further has a lateral connection portion that extends around said outer peripheral region of said functional transparent plate and that connects integrally said first and second adhesive layers.

7. The multifunctional lens assembly as claimed in claim 1, wherein said functional transparent plate further includes a lens plate having said outer peripheral region, and a conductive layer that is disposed on said lens plate and that can be electrified to heat said lens plate for defogging.

8. The multifunctional lens assembly as claimed in claim 7, wherein said conductive layer has at least one heating element, and at least one pair of electrode portions electrically connected to said at least one heating element.

9. The multifunctional lens assembly as claimed in claim 8, wherein said at least one heating element includes two heating elements that are disposed one above the other, said at least one pair of electrode portions including two pairs of electrode portions, each pair of which is electrically connected to one of said heating elements.

10. The multifunctional lens assembly as claimed in claim 7, wherein said conductive layer is disposed on one side of said lens plate facing toward the face shield.

11. The multifunctional lens assembly as claimed in claim 7, wherein said functional transparent plate further includes a functional layer coated on said lens plate, said functional layer having at least one of anti-ultraviolet, anti-glare, anti-reflection and anti-scratch functions.

12. The multifunctional lens assembly as claimed in claim 11, wherein said functional layer is disposed on another side of said lens plate opposite to said conductive layer.

\* \* \* \* \*